United States Patent
Sun et al.

(10) Patent No.: US 12,045,865 B2
(45) Date of Patent: Jul. 23, 2024

(54) PERSONALIZED MATTRESS SYSTEM AND MATTRESS CUSTOMIZATION METHOD

(71) Applicant: SHENZHEN ONETHIRD SLEEP TECHNOLOGY CO., LTD, Shenzhen (CN)

(72) Inventors: Chengjun Sun, Shenzhen (CN); Zhong Liu, Shenzhen (CN); Kuntao Lu, Shenzhen (CN); Yong Le, Shenzhen (CN)

(73) Assignee: SHENZHEN ONETHIRD SLEEP TECHNOLOGY CO., LTD

( * ) Notice: Subject to any disclaimer, the term of this patent is extended or adjusted under 35 U.S.C. 154(b) by 0 days.

(21) Appl. No.: 17/640,353

(22) PCT Filed: May 13, 2020

(86) PCT No.: PCT/CN2020/090074
§ 371 (c)(1),
(2) Date: Apr. 5, 2023

(87) PCT Pub. No.: WO2021/217728
PCT Pub. Date: Nov. 4, 2021

(65) Prior Publication Data
US 2023/0267522 A1   Aug. 24, 2023

(30) Foreign Application Priority Data
Apr. 26, 2020 (CN) .......................... 202010339691.3

(51) Int. Cl.
G06Q 30/0601 (2023.01)
A47C 27/08 (2006.01)
A47C 31/12 (2006.01)

(52) U.S. Cl.
CPC ....... *G06Q 30/0621* (2013.01); *A47C 27/082* (2013.01); *A47C 31/123* (2013.01)

(58) Field of Classification Search
CPC ....... A47C 27/00; A47C 27/08; A47C 27/082; A47C 27/083; A47C 31/12; A47C 31/123; G06Q 30/0621
See application file for complete search history.

(56) References Cited

U.S. PATENT DOCUMENTS

| 9,591,995 B2 * | 3/2017 | Blumberg | ............... A47C 17/62 |
| 2008/0052837 A1 * | 3/2008 | Blumberg | ............... A47C 27/10 600/300 |

(Continued)

FOREIGN PATENT DOCUMENTS

| CN | 105231995 A | 1/2016 |
| CN | 108512934 A | 9/2018 |

(Continued)

*Primary Examiner* — Justin C Mikowski
*Assistant Examiner* — George Sun
(74) *Attorney, Agent, or Firm* — Jose Cherson Weissbrot (57) ABSTRACT

The present disclosure discloses a personalized mattress system and a mattress customization method. The personalized mattress system includes a client, an adjustable mattress device, and a cloud, wherein the client includes a user login unit, a user personal customization unit, a mattress control unit, and a data communication unit; the adjustable mattress device includes a data communication unit, a main control unit, an algorithm unit, a sensing unit, an adjustment unit, and a local data storage unit; and the adjustable mattress device acquires user customization information from the client or the cloud through the data communication unit and perform mattress adjustment.

9 Claims, 4 Drawing Sheets

(56) References Cited

U.S. PATENT DOCUMENTS

| | | | |
|---|---|---|---|
| 2011/0138539 A1* | 6/2011 | Mahoney | A47C 27/082 5/713 |
| 2013/0019408 A1* | 1/2013 | Jacofsky | A61B 5/447 5/613 |
| 2014/0277822 A1* | 9/2014 | Nunn | A47C 27/083 700/301 |
| 2018/0073948 A1* | 3/2018 | Moniaci | G01L 19/0038 |
| 2019/0075931 A1* | 3/2019 | Yu | A47C 27/10 |
| 2019/0201266 A1* | 7/2019 | Sayadi | A47C 21/003 |
| 2019/0336721 A1* | 11/2019 | Tsern | A47C 23/002 |
| 2020/0405526 A1* | 12/2020 | Yu | A61B 5/4836 |
| 2021/0059426 A1* | 3/2021 | Bussert | A61H 9/0078 |

FOREIGN PATENT DOCUMENTS

| | | |
|---|---|---|
| CN | 109391674 A | 2/2019 |
| CN | 109480534 A | 3/2019 |
| CN | 110084667 A | 8/2019 |

\* cited by examiner

PERSONALIZED MATTRESS SYSTEM AND MATTRESS CUSTOMIZATION METHOD

CROSS-REFERENCE

The instant application is a continuation of International Application No. PCT/CN2020/090074, filed on May 13, 2020 and claimed the priority of Chinese patent application No. 202010339691.3 filed on Apr. 26, 2020, the entire contents thereof are incorporated by reference.

TECHNICAL FIELD

The present disclosure belongs to the technical field of mattresses, and specifically relates to a personalized mattress system and a mattress customization method.

BACKGROUND

Sleep quality is very important for modern people. It relates to human health and the living and working state of the next day. A mattress is an important factor affecting the sleep quality. Choosing a good mattress is very important to improve the sleep quality. A mattress will accompany a user for a long time. Every user will have his own preference for mattress's hardness, and for a certain person, his/her body needs different supports for different parts in different sleeping postures. Different people have different body shapes, so that the supports required vary from person to person. At present, it is difficult for a traditional mattress to achieve real-time adjustment of a body pressure for different people in various sleeping postures. At present, there are some adjustable mattresses, for example, pressures on various parts of the body are adjusted by means of mechanical lifting or inflation and deflation of air bags, so as to achieve a more comfortable and healthier sleep. However, it is difficult to choose/customize a mattress that is suitable for the person when a person change the mattress or go out to live in a hotel. If this problem can be solved, fatigue can be fully relieved, and the work efficiency can be improved, for people traveling on business.

For people who travel on business frequently, it is difficult for fixed mattresses in a hotel to adapt to different people. Usually because a bed in a hotel is too soft or too hard to achieve high-quality sleep, it affects the work in the next day. In the long run, the physical health will also be significantly affected. For example, there is something wrong in the lumbar vertebra, cervical vertebra and the like. How to make the mattress in the hotel have the same level of comfort as the mattress at home is a technical problem faced by many hotels.

SUMMARY

In order to solve the above problems, a personalized mattress is provided for a user which needs to change a mattress, for example, achieving the same comfort in a hotel as that of the mattress at home. One embodiment of the present disclosure provides a mattress customization system, which can provide efficient and intelligent mattress operations for the user and can realize that one mattress is applicable to different people. For the same person, in different scenarios or places, different mattresses can be applicable to this person. For example, a hotel can provide users with a mattress that is the same as the mattress at home.

The first embodiment of the present disclosure provides a personalized mattress system including a client, an adjustable mattress device, and a cloud, wherein the client includes a user login unit, a user personal customization unit, a mattress control unit, and a data communication unit; the adjustable mattress device includes a data communication unit, a main control unit, an algorithm unit, a sensing unit, an adjustment unit, and a local data storage unit; the cloud is configured for storing personal data of a user; the client or the cloud serves as an intermediate node, so that the client, the adjustable mattress device, and the cloud communicate with each other; and the adjustable mattress device acquires user customization information from the client or the cloud through the data communication unit and perform mattress adjustment.

Preferably, the client further includes a mattress state display device configured for displaying pressure information of the mattress.

Furthermore, the user personal customization unit is configured for recording and storing personal customization information of the user; the personal customization information includes at least one of a height, weight, age and gender of the user, data on various parts of the body, sizes of clothes and pants, body type characteristic data, a body mass index (BMI), diseases or physical discomfort information, sleep preference data (such as the heights of a pillow and a mattress), and whether the user belongs to special population (such as a pregnant woman), and also includes at least one of user pressure data information recorded by the sensing unit in the adjustable mattress device when the user lies on the mattress.

Furthermore, the data on the various parts of the body includes at least one selected from the group consisting of shoulder width, chest circumference, waist circumference, hip circumference, shoulder-hip width and shoulder height.

Furthermore, the data communication unit, the main control unit, the algorithm unit, the sensing unit, the adjustment unit, and the local data storage unit are all integrated in the adjustable mattress device.

Preferably, the adjustable mattress device includes one or a combination of more of pneumatic, hydraulic and mechanical movement adjustment structures.

The second embodiment of the present disclosure further provides a mattress customization method, including the following steps:

S1: acquiring personal customization information of a user, the personal customization information being bound to the customer login information, where the personal customization information includes at least one of a height, weight, age and the gender of the user, data on various parts of the body, sizes of clothes and pants, body type characteristic data, a BMI, diseases or physical discomfort information, sleep preference data, and whether the user belongs to special population, and also includes at least one of user pressure data information, height data, and hardness data recorded when the user lies on the mattress.

S2: selecting a target mattress, and transmitting the personal customization information obtained in the step S1 to the target mattress; if the target mattress needs to be changed, downloading and obtaining the personal customization information from a cloud and then proceeding the next step; if the target mattress is not changed, proceeding directly to the next step.

S3: storing and updating, by the target mattress, the personal customization information.

S4: performing mattress adjustment by the target mattress according to the personal customization information, the mattress adjustment including hardness adjustment or height adjustment.

Preferably, the step S1 further includes uploading the personal customization information to and downloading the personal customization information from the cloud.

Preferably, the user pressure data information in the step S1 includes at least one of pressure data information of the various parts of the body, height data, and hardness data of each part of the body set by the user.

The third embodiment of the present disclosure further provides software for implementing the above method.

Compared with the prior art, the beneficial effects of the present disclosure are as follows: the mattress customization system provided by the present disclosure can customize a mattress with specific hardness according to user's requirements, a designated part of which has specific hardness, and a mattress that makes the user have the most comfortable sleep posture can be quickly customized. When the customization system includes a cloud system, customization data selected by the user can be stored in the cloud, or is downloaded from the information stored in the cloud and compared with the information, so that personalized customization operations can be fully achieved.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also can acquire other drawings according to the provided drawings without doing creative work.

DETAILED DESCRIPTION OF THE EMBODIMENTS

In order to make the technical problems, technical solutions and beneficial effects of the present disclosure clearer, the present disclosure is further described below in detail with reference to accompanying drawings and embodiments. It should be understood that the specific embodiments described here are merely to explain the present disclosure, and not intended to limit the present disclosure.

Figure 1:
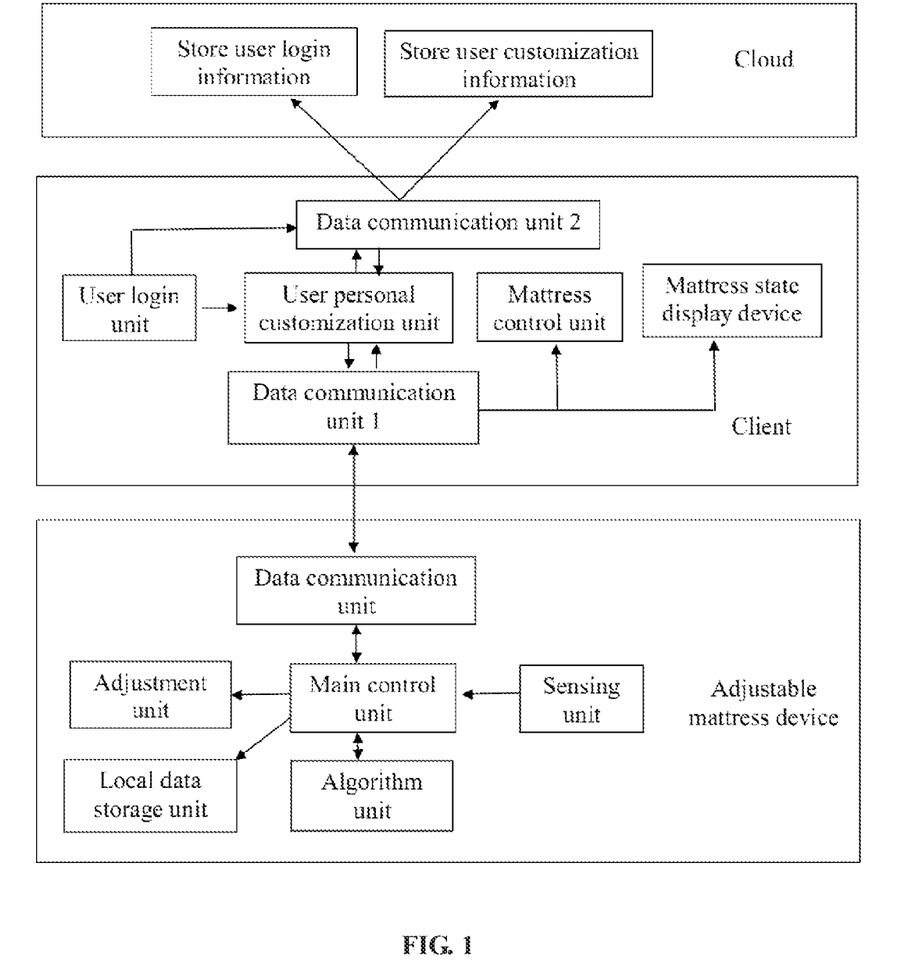
FIG. 1 is a schematic structural diagram of a mattress customization system provided by an embodiment of the present disclosure.

One embodiment of the present disclosure provides a mattress customization system, i.e., a personalized mattress system. As shown in FIG. 1, the mattress customization system includes a client and an adjustable mattress device, and further includes a cloud. The cloud is configured for storing personal data of a user. The client or the cloud serves as an intermediate node, so that the client, the adjustable mattress device, and the cloud communicate with each other. Specifically, the client includes a user login unit, a user personal customization unit, a mattress control unit, a data communication unit, a first data communication unit, and a second data communication unit. As shown in the figures, the user login unit is connected with the user personal customization unit. The user personal customization unit is connected with the first data communication unit and the second data communication unit, respectively and mutually transmits data. The first data communication unit is simultaneously connected with the mattress control unit and the mattress state display device. The user login unit is configured for recording user login information, such as an account and a password typed in by the user to enter the client. The user personal customization unit is configured for recording and storing the personal customization information of the user. The user can type in some customization data through the client, such as the basic information of the user or customized pressure data. The basic information of the user includes at least one of a height, weight, age and gender of the user, data on various parts of the body (such as a shoulder width, a chest circumference, a waist circumference, a hip circumference, a shoulder-hip width, and a shoulder height), sizes of clothes and pants, body type characteristic data, a BMI, physical health information (whether there is a disease or physical discomfort, and other information), sleep preference data (such as preference for heights and hardness of a pillow and a mattress, and whether the user belongs to special population (for example, whether an age-appropriate female is pregnant). The user login information is bound to the personal information (basic information) of the user in a one-to-one correspondence manner.

By setting the client, it is convenient for a customer to operate, record and store the relevant data typed in by the customer.

The mattress state display device in the client displays some information of the mattress, which is convenient for the user to operate and understand. For example, the client can display the pressure information of each area of the mattress in a current state, or display a current adjustment state of the mattress, which areas are being adjusted, and the like. Specifically, the pressure information of each area of the mattress can be displayed through one or more of a 3D image, a 2D pressure heat map, or a one-dimensional histogram, and various display modes can be freely switched. Specifically, the mattress state display device may be a display, a touch display screen, a tablet computer, and the like. For the tablet computer, other units in the client can be integrated into the tablet computer.

The first data communication unit in the client is connected and communicates with the adjustable mattress device, and the second data communication unit communicates with the cloud through a wireless network. The mattress control unit of the client mainly sends a control instruction to the adjustable mattress device to complete some specific operations, such as automatically adjusting the pressure of each area of the mattress, or allowing the user to manually adjust the pressure of each area of the mattress.

In a preferred embodiment, the client stores both the user login information and the user customization information in the cloud, which facilitates management of information of more users. The background of the client also stores sonic data, including the user login information and the user personal customization information.

In particular, the adjustable mattress device is an intelligently adjustable mattress, which can identify the pressure of a human body and make corresponding adjustment. In one embodiment of the present disclosure, the adjustable mattress device includes a data communication unit, a main control unit, an algorithm unit, a sensing unit, an adjustment unit, and a local data storage unit. The main control unit is connected with the data communication unit, the sensing unit, the adjustment unit, the algorithm unit, and the local data storage unit, respectively. The above data communication unit, the main control unit, the algorithm unit, the sensing unit, the adjustment unit, and the local data storage unit are all integrated in the mattress, for example, this is implemented by an integrated chip.

The sensing unit in the adjustable mattress device is configured for collecting a pressure generated by the human body (the user) on the mattress, converting the pressure into a digital signal and transmitting it to the main control unit. As a control center, the main control unit receives the digital signal transmitted by the sensing unit to collect sensed data, controls the data transmission of the data communication unit, processes the typed-in data, and controls, according to the received communication data, the adjustment unit, so as to achieve the adjustment of the software of the mattress. On the other hand, the main control unit also stores the information customized by the user into the local data storage unit.

The algorithm unit in the adjustable mattress device is configured for analyzing and processing the sensed data transmitted by the sensing unit and outputting an adjustment instruction. The adjustment instruction contains information on how the adjustment unit adjusts the specific structure of the mattress. The adjustment unit includes a structure for adjusting support forces on various parts of the human body and the hardness of the mattress. For example, an air bag mattress is adjusted by inflating and deflating air bags. The structure can include a plurality of air bag adjustment units. If there are more airbags, the adjustment is finer. For a mechanically adjusted mattress, the adjustment is carried out by rise and fall of the mechanical structure.

In particular, the adjustable mattress device includes one or a combination of more of pneumatic, hydraulic and mechanical movement adjustment structures.

The local data storage unit of the adjustable mattress device is configured for storing the data typed in by the user through the client and transmitting the data to the algorithm unit, so as to achieve better personalization suitable for the user. The stored data unit can be some basic information of the user, such as the height, weight, age, and sizes of various parts of the body, or can be pressure data recorded by the user through the mattress according to certain stipulated sleep postures or actions, which is similar to recording fingerprint information in a mobile phone, such as recording pressure data of the user in lying on the back and lying on the side. Specific data can be stored in groups and named separately. When retrieving the data, the data can be retrieved through file names.

The data communication unit in the adjustable mattress device is connected and communicates with the first data communication unit of the client in a wired or wireless manner. The data is preferably transmitted wirelessly, such as Bluetooth or WIFI.

Figure 2:
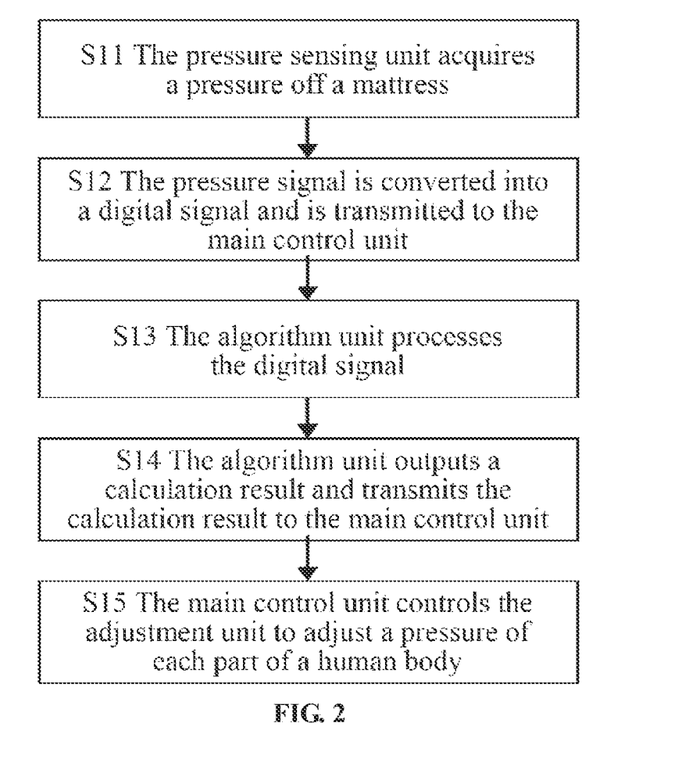
FIG. 2 is a work flow diagram of an adjustable mattress device in a mattress customization system provided by an embodiment of the present disclosure.

FIG. 2 illustrates an operation flow of the adjustable mattress device in the mattress customization system provided by an embodiment of the present disclosure. The adjustment operation flow includes the following steps:

S11, the pressure sensing unit acquires a pressure applied by a user to a mattress;

S12, the pressure sensing unit converts a pressure signal into a digital signal and transmits it to the main control unit;

S13, the main control unit transmits the digital signal to the algorithm unit, the algorithm unit processing the pressure digital signal for calculation, the calculation being performed by referring to locally stored user customization data, so that the locally stored user customization data is a key parameter deciding an algorithm of this step; if the user customization data is more accurate and finer, the algorithm is more accurate;

S14, the algorithm unit outputs an identification result (a calculation unit), and transmits the identification result to the main control unit;

S15, the main control unit controls the adjustment unit to adjust a pressure and hardness of each part mattress corresponding to each part of a human body; the adjustment operation is simultaneously performed on separate areas.

Customization of mattresses can be achieved for different customers by acquiring the above pressure information and adjusting the pressure and the hardness of each area of the mattress. After the user types in the personal information (as described above), the user lies on the mattress. The mattress automatically detects and calculates a pressure value of each area and is adjusted according to the information typed in by the user in advance until the user is satisfied. After the user completes the customization, the customization information is uploaded to the cloud and stored. When the customer logs in to the personal account later, the customization information can be directly retrieved, and the customization information can be applied to a new mattress at any time, such as an intelligent mattress in a hotel, which saves the time and improves the quality of sleep and rest.

Preferably, the pressure in the step S11 is a pressure of each part of the user's body in the most comfortable state, and this most comfortable state can be achieved by interactive adjustment between the user and the client.

Figure 4:
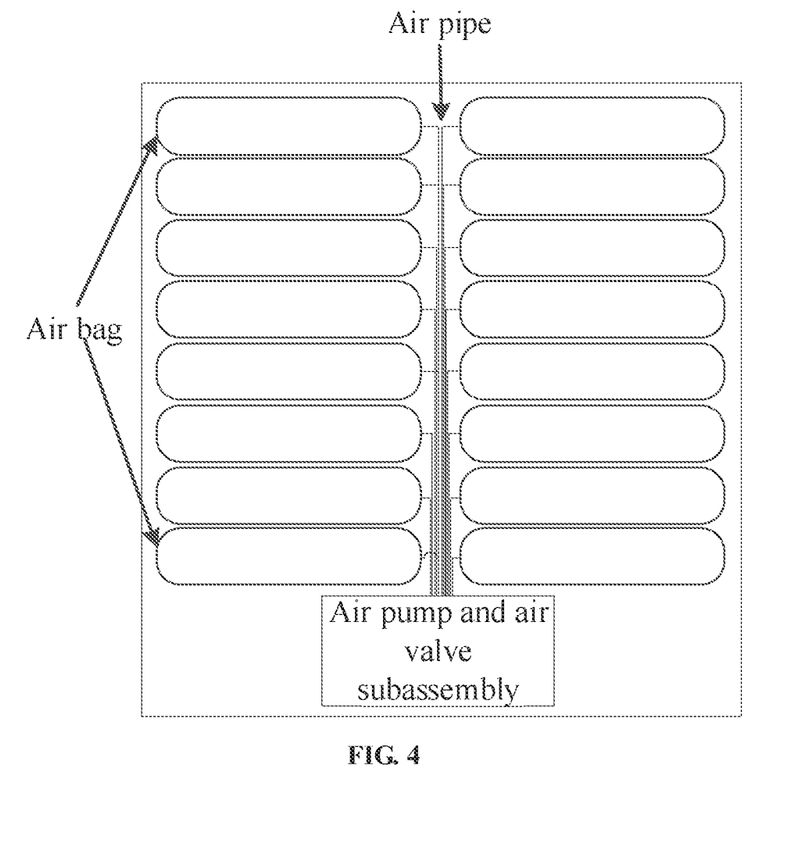
FIG. 4 is a schematic diagram of an air bag adjustment device in an adjustment unit in a mattress customization system provided by an embodiment of the present disclosure.

In particular, the adjustment unit may be air bag adjustment or mechanical adjustment. The air bag adjustment is preferred. As shown in FIG. 4, the adjustment unit includes air bags, an air pump and air valve subassembly, and an air pipe. The air bags are uniformly distributed from the head area to the thigh area of the mattress. The air bags are arranged in a 2*8 combination of single air bags. That is, 2 columns of air bags are arranged symmetrically on the left and right along a width direction of the mattress, and 8 rows of single air bags are arranged side by side along a lengthwise direction of the mattress. The air pump and air valve subassembly includes an air pump and 16 air valves. The single air bag is connected to one air pipe, and the air pipes of adjacent single air bags are not connected. The air pipes are connected to the air pump and air valve subassembly, and each air pipe is controlled by one air valve. The air pump and the air valves are turned on or turned off to inflate and deflate the single air bags in sequence. The air bag itself can adjust the height and hardness by inflation and deflation, and the adjustment module 23 includes a plurality of air bags. Therefore, the adjustment module 23 adjusts the hardness of each area of the mattress through the inflation and deflation of each air bag. In other embodiments of the present disclosure, the number of the air bags and the number of the corresponding air valves may be different from this embodiment. In the prior art, the hardness of the mattress is mainly adjusted in two ways. One way is to adjust the hardness of the mattress by adjusting the hardness of a material in the mattress. However, after the mattress is configured for a long time, there is a problem of material deformation, thus affecting the comfort of the mattress. The air bag adjustment is adopted in the embodiment of the present disclosure. The height and hardness of the air bag are adjusted through inflation and deflation, thus effectively adjusting the hardness of each area of the mattress, so that the comfort of the mattress is better, which is helpful to improve the user experience.

Figure 3:
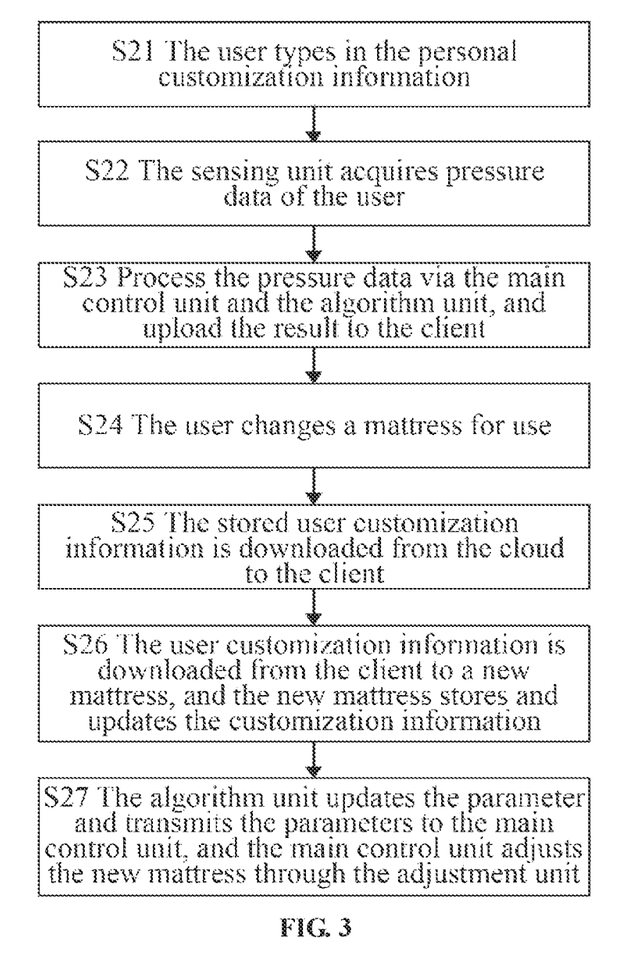
FIG. 3 is a work flow diagram of a mattress customization system provided by an embodiment of the present disclosure.

FIG. 3 illustrates a mattress customization method provided by an embodiment of the present disclosure. The method specifically includes:

- S21, a user logs in to a client and types in personal customization information, the customization information including a height, weight, age, size of various parts of the body, etc., the customization information is uploaded to the cloud through the client and bound with customer login information;
- S22, the user lies on the mattress, and the sensing unit in the mattress acquires current pressure data of the user, converts the pressure into a digital signal, integrates the digital signal into the personal customization information, and transmits the information to the main control unit;
- S23, the information is processed by the main control unit and the algorithm unit, and a calculation processing result is uploaded to the client;
- S24, the user changes a mattress for use, either by purchasing a new mattress, or by typing in corresponding information when the user checks into a hotel;
- S25, the cloud downloads the stored user customization information to the client;
- S26, the client transmits the user customization information to the new mattress, and the new mattress stores and updates the user customization information;
- S27, the algorithm unit updates the key parameters to adapt to the current user, and transmits the updated data to the main control unit; the main control unit adjusts the mattress through the adjustment unit, so that a new mattress that has the same mattress hardness and the same height of each part as those of the old mattress of the user can be obtained.

In the above process, the customization information is firstly stored and uploaded to the cloud, and then the user changes a mattress. The new mattress pulls the personal customization data from the cloud, and performs corresponding calculation and adjustment, so that this new mattress can quickly adapt to the user to achieve the best adjustment, which lets the user use the same mattress as that used at home. On the other hand, for the same mattress, the customization data can be pulled down/downloaded from the cloud, and then adaptive calculation and adjustment can be performed to satisfy different users, so that one mattress can be used by multiple users. The same user can also sleep on different mattresses in different places. These mattresses have the same adjustment parameters for hardness and support forces. For example, when a user stays in a hotel, if the user has the same mattress at home, which is customized before, the user only needs to bind the mattress at home. When the mattress in the hotel is bound by the user as a new mattress, the personal customization data of the user can be automatically pulled from the cloud, so that this mattress can instantly become his personal customized mattress.

In this step, if the target mattress needs to be changed, the data is pulled down from the cloud; if the target mattress is not changed, the data is directly stored.

In particular, in the above mattress customization method, the client may be an ordinary desktop computer, a laptop computer, a mobile phone, a tablet computer, a smart watch, or the like.

In particular, the above step S22 also includes an operation for adjusting the mattress by the user. For example, after the mattress is intelligently adjusted, the user can feed back. The Partial Pressure is not satisfactory and adjust the pressure until the user is satisfied.

In particular, the processing by the main control unit and the algorithm unit in the above step S23 is specifically processing and storage the digital signal corresponding to the pressure data, so as to facilitate subsequent retrieval.

In the above step S24, changing the mattress may include changing the mattress if the user moves, purchasing a new mattress, or staying in a hotel.

In one embodiment, if the intelligent mattress of the user is not connected to an Internet, the data of the intelligent mattress at home can be manually transmitted to the client and is then uploaded to the cloud through the client, that is, the steps S22 and S23 are manually executed.

In particular, in the step S26, the intelligent mattress uses the main control unit to store and update the downloaded user customization information.

In the step S27, the algorithm unit in the intelligent mattress updates the key parameters in the user customization information and transmits the information to the main control unit; and then the hardness and height are adjusted through the adjustment unit, so that the parameters of the new mattress are consistent with the parameters of the old mattress of the user.

For users with intelligent mattresses, to set up their own smart mattresses, the users only need to upload the corresponding parameter information, without other operations, and the operation can be completed automatically in the background. When checking into a hotel, the users can enjoy the comfort like the home mattress.

Another embodiment of the present disclosure further provides software for implementing the mattress customization method.

The above descriptions are only the preferred embodiments of the present disclosure, and are not intended to limit the present disclosure. Any modifications, equivalent replacements and improvements that are made within the spirit and principle of the present disclosure shall fall within the protection scope of the present disclosure.

What is claimed is:

1. A personalized mattress system comprising a client, an adjustable mattress device, and a cloud,
wherein the client comprises a user login unit, a user personal customization unit, a mattress control unit, a first data communication unit and a second data communication, wherein the user login unit is connected with the user personal customization unit, the user login unit is configured for recording user login information which is bound to the customer login information; the adjustable mattress device comprises a third data communication unit, a main control unit, an algorithm unit, a sensing unit, an adjustment unit, and a local data storage unit; the cloud is configured for storing personal data of a user;
the client or the cloud serves as an intermediate node in such a way that the client, the adjustable mattress device, and the cloud communicate with each other;
the adjustable mattress device comprises a first adjustable mattress unit and a second adjustable mattress unit, when the user logs in the client for a first time, the user's personal customization information is input and the user lies on the first adjustable mattress unit, the user's current pressure data is acquired and integrated into the personal customization information for processing by the first adjustable mattress unit, and a processing result is uploaded to the client;

and when the user changes a mattress for use, the second adjustable mattress unit acquires user customization information from the client or the cloud through the data communication unit and perform mattress adjustment according to the user customization information in such a way that the second adjustable mattress unit has a same mattress parameter with the first adjustable mattress unit;

the user customization information comprises a pressure data recorded by the user through the mattress according to a certain stipulated sleep postures or actions;

wherein the user personal customization unit is configured for recording and storing personal customization information of the user; the personal customization information comprises at least one selected from the group consisting of height, weight, age and gender of the user, data on various parts of the body, sizes of clothes and pants, body type characteristic data, BMI index, body health condition information, sleep preference data, and whether the user belongs to special population, and further comprises user pressure data information recorded by the sensing unit in the adjustable mattress device when the user lies on the mattress:

wherein the data on the various parts of the body comprises at least one selected from the group consisting of shoulder width, chest circumference, waist circumference, hip circumference, shoulder-hip width and shoulder height;

wherein the adjustment unit comprises at least 2 columns and 8 rows of air bags and a corresponding number of air valves, wherein each air bag is controlled by one corresponding air valve.

2. The personalized mattress system of claim 1, wherein the data communication unit, the main control unit, the algorithm unit, the sensing unit, the adjustment unit, and the local data storage unit are all integrated in the adjustable mattress device.

3. The personalized mattress system of claim 1, wherein the adjustable mattress device comprises one or more selected from the group consisting of pneumatic adjustment structure, hydraulic adjustment structure and mechanical movement adjustment structure.

4. The personalized mattress system of claim 2, wherein the data communication unit, the main control unit, the algorithm unit, the sensing unit, the adjustment unit, and the local data storage unit are all integrated in an integrated chip.

5. The personalized mattress system of claim 1, the client is configured to an ordinary desktop computer, a laptop computer, a mobile phone, a tablet computer, or a smart watch.

6. The personalized mattress system of claim 1, wherein the pressure information of each area of the mattress is displayed through one or more of a 3D image, a 2D pressure heat map, or a one-dimensional histogram.

7. A mattress customization method comprising the following steps:
- S1: acquiring personal customization information of a user which is bound to a customer login information, the user logs in to a client and types in personal customization information, wherein the personal customization information comprises at least one selected from the group consisting of height, weight, age and the gender of the user, data on various parts of the body, sizes of clothes and pants, body type characteristic data, BMI index, diseases or physical discomfort information, sleep preference data, and whether the user belongs to special population, and also comprises at least one of user pressure data information, height data, and hardness data recorded when the user lies on the mattress, and uploading the personal customization information to a cloud;
- the user lies on the mattress, and a sensing unit in the mattress acquires current pressure data of the user, converts the pressure into a digital signal, integrates the digital signal into the personal customization information, and transmits the information to a main control unit; the information is processed by the main control unit and an algorithm unit, and a calculation processing result is uploaded to the client;
- S2: selecting a target mattress, and transmitting the personal customization information obtained in step S1 to the target mattress; if the target mattress needs to be changed, downloading and obtaining the personal customization information from a cloud and proceeding a next step; if the target mattress is not changed, proceeding directly to the next step;
- S3: storing and updating the personal customization information by the target mattress;
- S4: performing mattress adjustment by the target mattress according to the personal customization information, wherein the mattress adjustment comprises hardness adjustment or height adjustment, so as to obtain a mattress has a same parameter with a former mattress;
wherein the mattress adjustment is implemented by an adjustment unit which comprises at least 2 columns and 8 rows of air bags and a corresponding number of air valves, wherein each air bag is controlled by one corresponding air valve.

8. The method of claim 7, wherein the user pressure data information in the step S1 comprises at least one selected from the group consisting of pressure data information of the various parts of the body, height data, and hardness data of each part of the body set by the user.

9. The method of claim 7, if the mattress is not connected to an Internet, the data of the mattress can be manually transmitted to the client and is then uploaded to the cloud through the client.

* * * * *